(12) United States Patent
McMahon et al.

(10) Patent No.: US 10,246,009 B2
(45) Date of Patent: Apr. 2, 2019

(54) USER NOTIFICATION OF POWERED SYSTEM ACTIVATION DURING NON-CONTACT HUMAN ACTIVATION

(71) Applicant: Magna Closures Inc., Newmarket (CA)

(72) Inventors: Gerard McMahon, Aurora (CA); Liviu Bolbocianu, Toronto (CA); Samuel Ricardo Baruco, Aurora (CA); Pratibha Jagdish Pose, Thornhill (CA)

(73) Assignee: MAGNA COLSURES INC., Newmarket (CA)

( * ) Notice: Subject to any disclaimer, the term of this patent is extended or adjusted under 35 U.S.C. 154(b) by 0 days.

(21) Appl. No.: 15/696,657

(22) Filed: Sep. 6, 2017

(65) Prior Publication Data

US 2018/0065545 A1     Mar. 8, 2018

Related U.S. Application Data

(60) Provisional application No. 62/384,930, filed on Sep. 8, 2016.

(51) Int. Cl.
| | |
|---|---|
| *B60Q 1/50* | (2006.01) |
| *E05F 15/73* | (2015.01) |
| *B60Q 1/32* | (2006.01) |
| *B60Q 1/30* | (2006.01) |
| *E05F 15/76* | (2015.01) |

(52) U.S. Cl.
CPC .............. *B60Q 1/50* (2013.01); *B60Q 1/30* (2013.01); *B60Q 1/32* (2013.01); *E05F 15/73* (2015.01); *E05F 15/76* (2015.01); *B60Q 2400/50* (2013.01); *B60Q 2900/30* (2013.01); *E05Y 2900/531* (2013.01); *E05Y 2900/546* (2013.01)

(58) Field of Classification Search
USPC .......................................................... 701/49
See application file for complete search history.

(56) References Cited

U.S. PATENT DOCUMENTS

| | | |
|---|---|---|
| 5,371,659 A | 12/1994 | Pastrick et al. |
| 5,497,305 A | 3/1996 | Pastrick et al. |
| 5,669,699 A | 9/1997 | Pastrick et al. |

(Continued)

FOREIGN PATENT DOCUMENTS

| | | |
|---|---|---|
| WO | WO2011044312 A1 | 4/2011 |
| WO | WO2012051500 A1 | 4/2012 |

(Continued)

*Primary Examiner* — Tyler D Paige
(74) *Attorney, Agent, or Firm* — Dickinson Wright PLLC (57) ABSTRACT

A user-activated, non-contact power closure member system and method of operating a closure member of a vehicle are provided. The system includes at least one sensor for sensing an object or motion. An indicator is located on the vehicle to inform the user of the appropriate location to make an activation gesture, which initiates opening of the closure member. The indicator is located adjacent the at least one sensor. The indicator also informs the user if the system is activated, in motion, and/or waiting for the activation gesture. An electronic control unit is connected to the at least one sensor and the indicator. When the object or motion is detected by the at least one sensor, the control unit notifies the user with the indicator, determines if the object or motion is the correct activation gesture, and initiates movement of the closure member.

20 Claims, 8 Drawing Sheets

(56) References Cited

U.S. PATENT DOCUMENTS

| | | | |
|---|---|---|---|
| 5,823,654 A | 10/1998 | Pastrick et al. | |
| 6,349,450 B1 | 2/2002 | Koops et al. | |
| 6,550,103 B2 | 4/2003 | Koops et al. | |
| 8,154,418 B2 | 4/2012 | Peterson et al. | |
| 9,340,197 B1* | 5/2016 | Miersch-Wiemers | B60D 1/26 |
| 9,646,436 B1* | 5/2017 | Campbell | G07C 9/00111 |
| 9,972,150 B2* | 5/2018 | Da Deppo | G07C 9/00111 |
| 2015/0316680 A1* | 11/2015 | Sieg | G01B 7/14 |
| | | | 324/686 |
| 2016/0083995 A1* | 3/2016 | Dezorzi | E05F 15/73 |
| | | | 340/5.72 |
| 2016/0137165 A1* | 5/2016 | Schindler | B60R 25/2045 |
| | | | 701/36 |
| 2018/0065545 A1* | 3/2018 | McMahon | B60Q 1/50 |

FOREIGN PATENT DOCUMENTS

| | | |
|---|---|---|
| WO | WO2013071070 A1 | 5/2013 |
| WO | WO2015148611 A1 | 10/2015 |

* cited by examiner

USER NOTIFICATION OF POWERED SYSTEM ACTIVATION DURING NON-CONTACT HUMAN ACTIVATION

CROSS-REFERENCE TO RELATED APPLICATIONS

This utility application claims the benefit of U.S. Provisional Application No. 62/384,930 filed Sep. 8, 2016. The entire disclosure of the above application is incorporated herein by reference.

FIELD

The present disclosure relates generally to power closure member systems for motor vehicles and, more particularly, to a user-activated, non-contact power closure member system for moving a vehicle closure member relative to a vehicle body from a closed position to an open position or from the open position to the closed position.

BACKGROUND

This section provides background information related to the present disclosure which is not necessarily prior art.

It is known to provide illumination or light sources at the side of the vehicle, such as to provide security lighting or convenience lighting at the side of the vehicle. For example, such lighting devices are described in U.S. Pat. Nos. 6,349,450; 6,550,103; 5,371,659; 5,669,699; 5,823,654 and 5,497,305, which are hereby incorporated herein by reference in their entireties. Typically, such lighting devices provide illumination along the side of the vehicle and down to the ground at the side of the vehicle.

Motor vehicles, such as sports utility vehicles, can additionally be designed to include a user-activated, non-contact power closure member system (e.g., power liftgate system) for automatically opening a closure member of the vehicle. The power closure member system includes a sensor to detect motion of the user desiring to open the closure member, for example a kicking motion of the user's foot beneath a rear bumper in the event that the closure member is a rear liftgate. The system includes technology to confirm the user, who is in possession of a key fob associated with the vehicle, is the source of the motion, so that the closure member is not incorrectly activated, for example by another human, animal, weather conditions, or objects which could enter the space beneath the bumper. The system allows for convenient, user-friendly opening of the closure member when the user's hands are occupied, for example when the user is holding items to be loaded in the vehicle. However, the user-activated, non-contact power closure member systems which are currently available could be improved.

SUMMARY

This section provides a general summary of the present disclosure and is not a comprehensive disclosure of its full scope or all of its features, aspects and objectives.

It is an aspect of the present disclosure to provide an improved user-activated, non-contact power closure member system for opening a closure member of a vehicle. The system includes at least one sensor for sensing at least one of an object and motion adjacent the closure member and outputting data corresponding to at least one of an object and motion. At least one indicator is disposed on the vehicle. An electronic control unit is coupled to the at least one sensor and the at least one indicator and is configured to receive and process data corresponding to the at least one of the object and motion from the at least one sensor. The electronic control unit is also configured to determine whether the data associated with the at least one of the object and motion is a correct activation gesture required to move the closure member. Additionally, the electronic control unit is configured to initiate movement of the closure member in response to the at least one of the object and motion being the correct activation gesture and notify the user using the at least one indicator.

Another aspect of the present disclosure is a method of operating a closure member of a vehicle using a non-contact power closure member system. The method begins by detecting at least one of an object and a motion located adjacent the closure member using at least one sensor. The method continues with the step of determining whether data associated with at least one of the object and the motion is an activation gesture which is required to initiate opening of the closure member. The method continues by initiating movement of the closure member in response to determining that the data associated with the at least one of the object and the motion is a correct activation gesture. The method also includes the step of notifying the user.

The user-activated, non-contact power closure member system and method of operating a closure member of a vehicle using a non-contact power closure member system according to the present disclosure provide numerous benefits, which are especially attractive to a user of the vehicle. Due to the indicator, also referred to as an icon, the user is now aware of whether the system is activated, in motion, and/or waiting for a gesture signal, such as a kicking motion, as they approach the vehicle. The user is also informed that they are making the activation gesture in the correct location, and that the activation gesture has been received by the system.

DRAWINGS

Other advantages of the present disclosure will be readily appreciated, as the same becomes better understood by reference to the following detailed description when considered in connection with the accompanying drawings wherein.

DETAILED DESCRIPTION

In the following description, details are set forth to provide an understanding of the present disclosure. In some instances, certain circuits, structures and techniques have not been described or shown in detail in order not to obscure the disclosure.

In general, at least one example embodiment of a user-activated, non-contact power closure member system 10 constructed in accordance with the teachings of the present disclosure will now be disclosed. A method of opening a closure member of a vehicle using the non-contact power closure member system 10 constructed in accordance with the teachings of the present disclosure will also be disclosed. The example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are described in detail. Also, the system 10 could alternatively be used to open and/or close another closure member of a vehicle, such as, but not limited to a sliding door or power swing door of the vehicle.

Referring initially to FIGS. 1-4, an example motor vehicle 12 is shown to include a closure member being a rear liftgate 14 mounted to a vehicle body 16. According to the example embodiment described in the present disclosure, the non-contact power closure member system 10 is integrated into a rear bumper 18 of the vehicle body 16 and used for controlling movement of the rear liftgate 14. However, the non-contact power closure member system 10 could be placed at another location, for example, and used for the rear liftgate 14 or used for a different closure member.

The non-contact power closure member system 10 includes at least one sensor 20 which senses an object or motion when a key fob 22 associated with the specific vehicle 12 is located within a predetermined distance of the vehicle 12, for example when the key fob 22 is in possession of a user 24 approaching the vehicle 12. Although the key fob 22 is used in the example embodiment, another component associated with the specific vehicle 12 and which can be detected by the vehicle 12 could be used or it may be possible to otherwise initialize the system 10 without using the keyfob 22. An example of the object detected by the at least one sensor 20 is a foot of the user 24, and an example of the motion detected by the at least one sensor 20 is a kicking or waving motion of the user 24. It should be appreciated that other objects and/or motions may be alternatively utilized.

Figure 1:
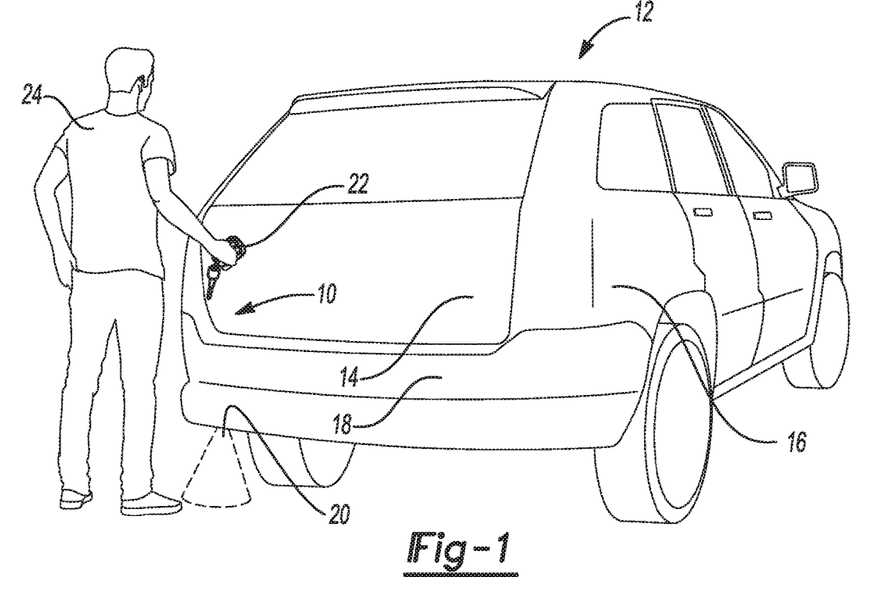
FIG. 1 is a perspective view of an example motor vehicle equipped with a user-activated, non-contact power closure member system for opening a rear liftgate of the vehicle which shows the location of at least one sensor and is constructed in accordance with the teachings of the present disclosure.
Figure 2:
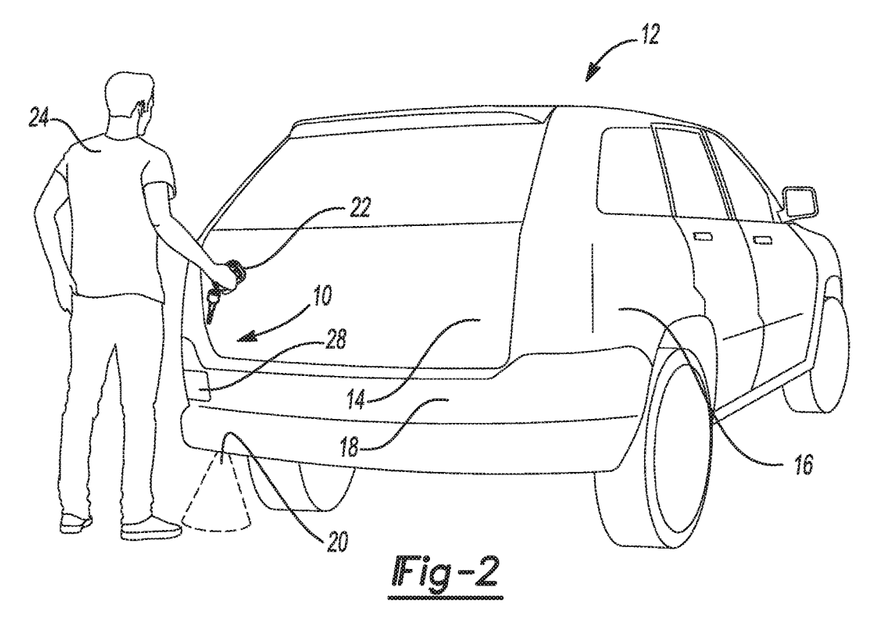
FIG. 2 is another perspective view of an example motor vehicle equipped with the user-activated, non-contact power closure member system for opening a rear liftgate of the vehicle which shows the location of an indicator and is constructed in accordance with the teachings of the present disclosure.
Figure 3:
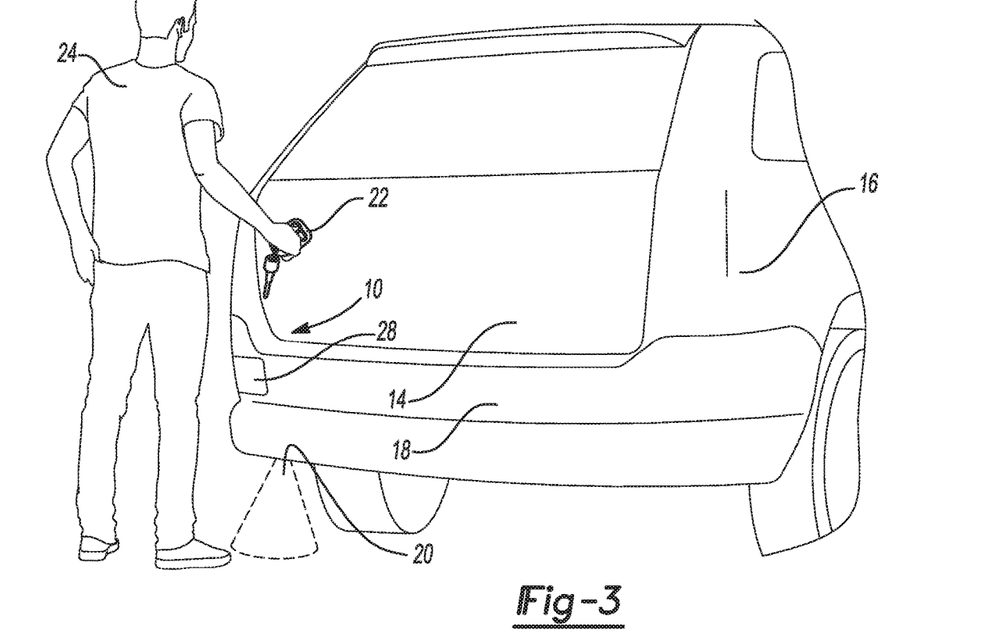
FIG. 3 is an enlarged view of a portion of the motor vehicle including the indicator shown in FIG. 2.
Figure 4:
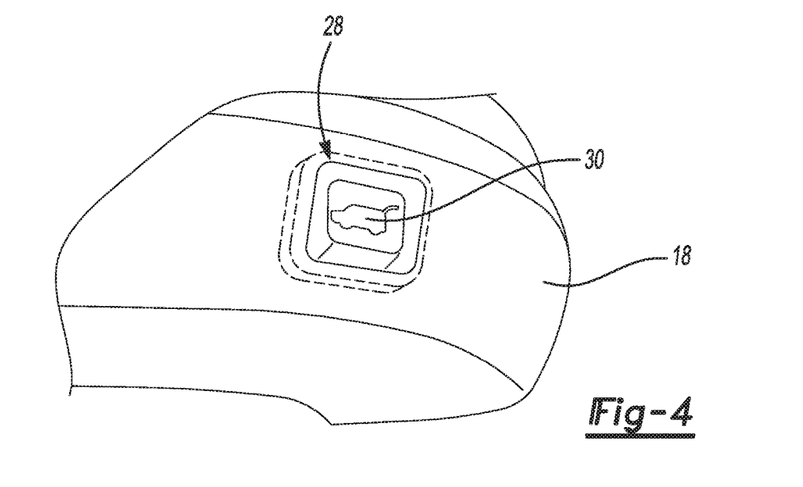
FIG. 4 is an enlarged view of a portion of an example bumper assembly of a motor vehicle having a user-activated, non-contact power closure member system constructed in accordance with the teachings of the present disclosure and which includes a graphic illuminated during activation (wake-up) and operation of the system.
Figure 5A:
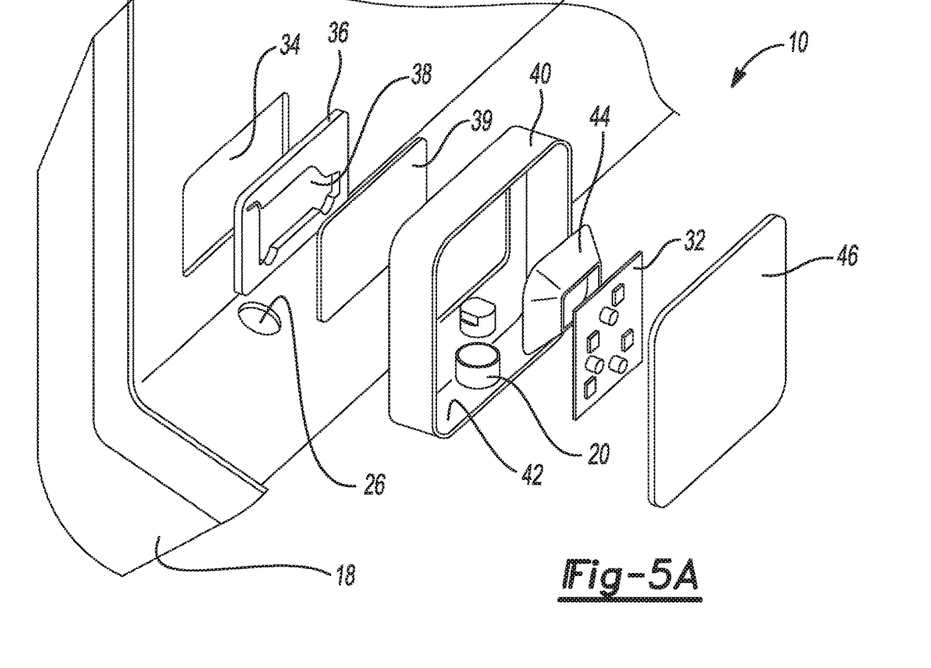
FIG. 5A is an exploded view of an example user-activated, non-contact power closure member system including a single sensor which is mounted on a rear bumper and constructed in accordance with the teachings of the present disclosure.
Figure 5B:
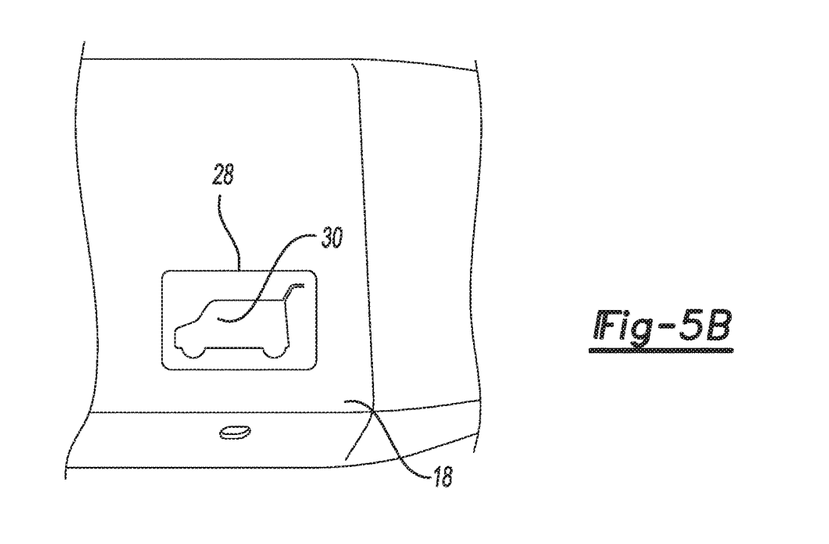
FIG. 5B is an exterior view of the example user-activated, non-contact power closure member system shown in FIG. 5A.
Figure 6A:
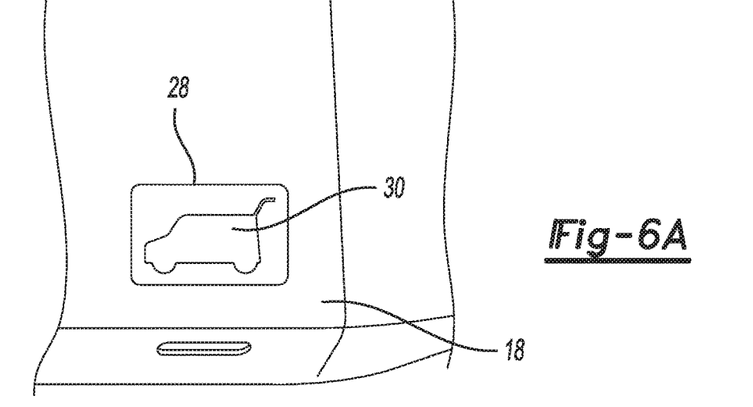
FIG. 6A is an exterior side view of an example graphic of a user-activated, non-contact power closure member system including a pair of sensors constructed in accordance with the teachings of the present disclosure and which is mounted on a rear bumper, and wherein the bumper has clearance slots for ultrasonic waves conveyed to and/or from the sensors.
Figure 6B:
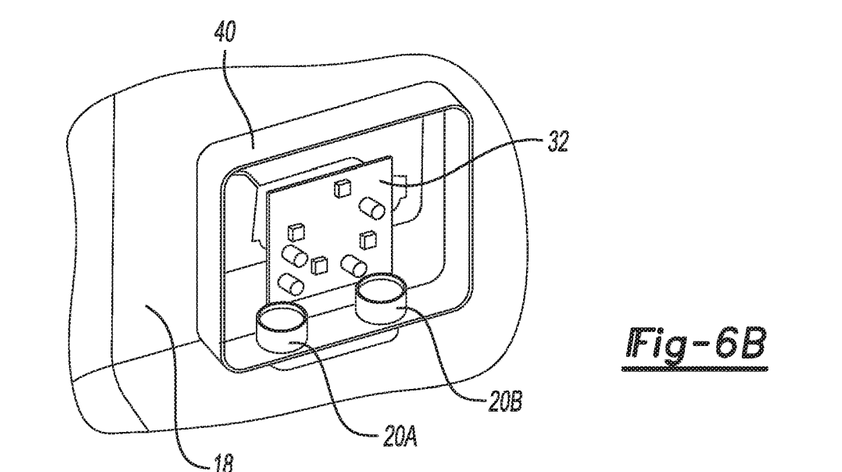
FIG. 6B is a perspective view from inside the rear bumper of an electronic control unit and the pair of sensors of the system of FIG. 6A.
Figure 6C:
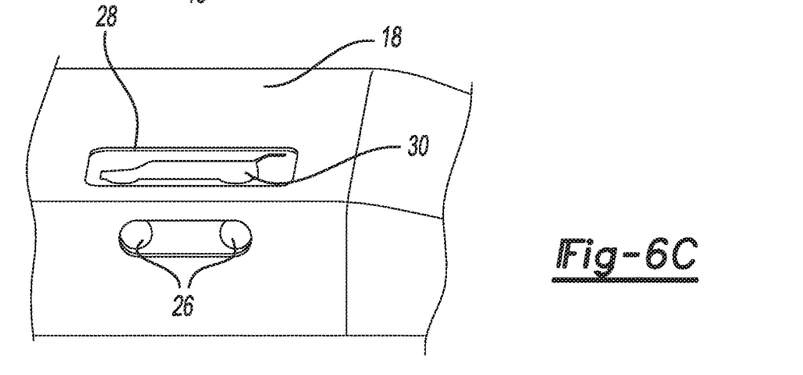
FIG. 6C is an exterior bottom view of the clearance slots of the rear bumper of FIG. 6A.
Figure 7A:
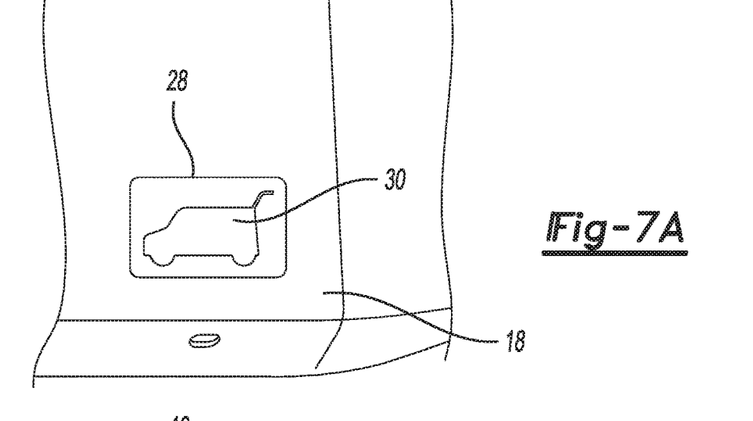
FIG. 7A is an exterior side view of an example graphic of a user-activated, non-contact power closure member system including a single sensor constructed in accordance with the teachings of the present disclosure and which is mounted on a rear bumper, and wherein the bumper has a clearance slot for ultrasonic waves conveyed to and/or from the sensor.
Figure 7B:
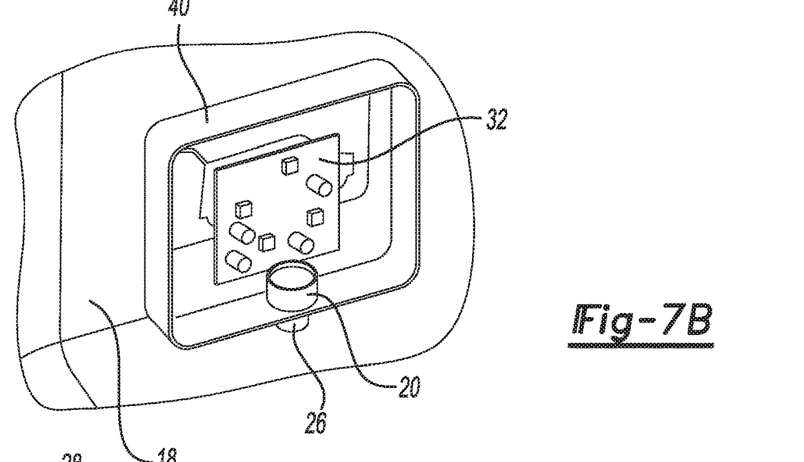
FIG. 7B is a perspective view from inside the rear bumper of an electronic control unit and the sensor of the system of FIG. 7A.
Figure 7C:
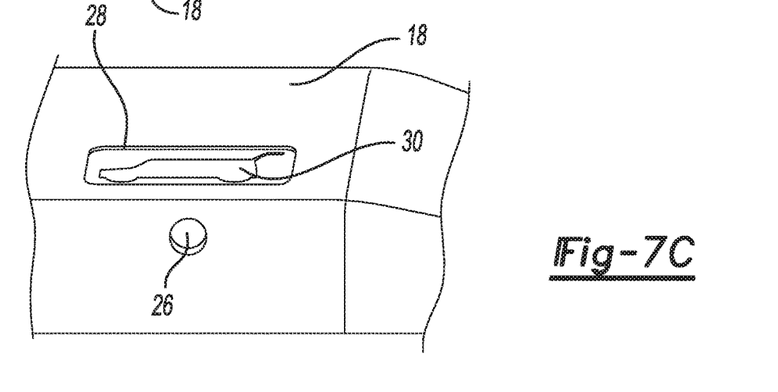
FIG. 7C is an exterior bottom view of the clearance slot of the rear bumper of FIG. 7A.

The at least one sensor 20 can comprise various different types of non-contact sensors in the non-contact power closure member system 10 constructed in accordance with the present disclosure. For example, the at least one sensor 20 could be an ultrasonic, capacitive, radar sensor, or another type of sensor capable of detecting an object or gesture without requiring physical contact. When the at least one sensor 20 is an ultrasonic sensor, the rear bumper 18 can include a clearance slot 26, as best shown in FIGS. 5-7, to allow ultrasonic waves to be conveyed to and/or the at least one sensor 20, for example, between the rear liftgate 14 and the ground. According to one embodiment, the non-contact power closure member system 10 includes a single ultrasonic sensor 20, as shown in FIGS. 5A-5C and 7A-7C.

As shown in FIGS. 2-8, the non-contact power closure member system 10 also includes an indicator 28 located on the vehicle 12 to inform the user 24 of the appropriate location to make an activation gesture which initiates opening of the closure member (e.g., liftgate 14). The activation gesture could be a movement made by the user 24, and/or or an object placed by the user 24 adjacent the at least one sensor 20. In the example embodiments, the indicator 28 is located adjacent the at least one sensor 20, for example on the rear bumper 18 of the vehicle 12. The indicator 28 can also inform the user 24 if the system 10 is activated or powered up, during system wake-up, in motion, has detected the user 24 approaching the vehicle 12, that the system 10 is receiving input from the user 24, and/or if the system 10 is waiting for the activation gesture signal. The indicator 28 of the example embodiment includes a graphic 30, also referred to as an icon, for example a lighted picture of an open liftgate, to alert the user 24. In this embodiment, the indicator 28 is referred to as ICON. The use of an actual icon located properly provides the user 24 with a visual indicator of where the at least one sensor 20 is located. This feature is beneficial to the user 24 and provides an advantage over comparative systems, which require the user 24 to guess where a sensor and/or the sensing zone of the sensor is located below a rear bumper 18.

An audible warning tone, honk, or beep can also be used, with or without the graphic 30, to alert the user 24. The indicator 28 can also include other features or components to notify the user 24, for example another type of light or lighted area along or near the rear bumper 18, tail lights, reverse lights, signal lights, an object or projection on a glass of the vehicle 12, for example a projected image or light. According to one example embodiment, the indicator 28 has a different color in the ON and OFF state and provides the user 24 with an idea of where to place his or her foot. Additionally, the indicator 28 used to notify the user 24 may be any other area on the vehicle 12 that could be visible to the user 24. In summary, various options are possible for the feature or features used as an indicator 28 to notify the user 24. The key point is that feedback is provided to the user 24 for foot detection.

The system 10 also includes an electronic control unit 32 executing software and connected to the at least one sensor 20. According to an aspect, the electronic control unit 32 is separate from and in communication with a power liftgate electronic control unit and the electronic control unit 32 can initiate the opening of the rear liftgate 14 by communicating with the power liftgate electronic control unit; however, it should be appreciated that the electronic control unit 32 itself could instead control the rear liftgate 14 or the functions of the electronic control unit 32 could alternatively be carried out by the power liftgate electronic control unit. When an object or motion is detected by the at least one sensor 20, such as the foot, the at least one sensor 20 sends data related to the object or motion to the electronic control unit 32 (i.e., software). The electronic control unit 32 processes the data from the at least one sensor 20 to determine if the object or motion is the activation gesture required to open the rear liftgate 14, rather than a false signal. If the data indicates the presence of the correct activation gesture, the electronic control unit 32 initiates opening of the rear liftgate 14. In the example embodiment, when the rear liftgate 14 about to open or opening, the indicator 28, for example the lighted graphic 30 and audible tone, are activated to notify the user 24.

Figure 8:
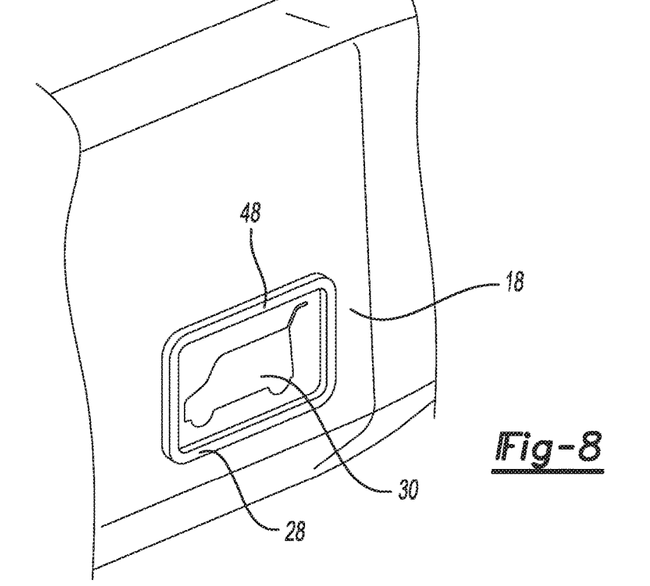
FIG. 8 illustrates an example optional trim bezel which can be installed around a graphic of a user-activated, non-contact power closure member system constructed in accordance with the teachings of the present disclosure to cover manufacturing defects and/or misalignments.

An exploded view of the user-activated, non-contact power closure member system 10 with one ultrasonic sensor 20 according to the example embodiment is shown in FIG. 5A. The system 10 includes the rear bumper 18 with an opening 34 for various components and the clearance slot 26 for ultrasonic waves transmitted to and/or from the ultrasonic sensor 20. An image cover 36 is disposed over the opening 34 which includes a cutout 38 of the graphic 30, in this case the vehicle 12 with the open liftgate 14. The image cover 36 is also painted to match the color of the vehicle body 16. An image diffuser 39, for example a translucent white plastic, is disposed over the image cover 26. Next, a housing 40 is disposed over the image diffuser 39. The ultrasonic sensor 20 is contained in the housing 40 and rests on a base wall 42 of the housing 40. A reflector 44 which directs light to the image or area of the graphic 30 is also disposed in the housing 40 adjacent the sensor 20. The electronic control unit 32 is also disposed in the housing 40. In the example embodiment, at least one light emitting diode (LED) is located on the far side of the electronic control unit 32. A cover 46 is disposed over the housing 40. As shown in FIG. 5B, which is an exterior view of the system 10 of FIG. 5A, the graphic 30 is visible through the cover 48. As shown in FIG. 8, the system 10 optionally includes a bezel 48 installed from the exterior of the rear bumper 18 to cover any manufacturing defects and/or misalignments that may be present.

According to another embodiment, the non-contact power closure member system 10 includes a pair of ultrasonic sensors 20A, 20B, referred to as dual sensors, as shown in FIGS. 6A-6C. In this embodiment, one of the sensors 20A transmits (Tx) and the other 20B receives (Rx) or listens. The dual sensors 20A, 20B provide the system 10 with an advantage over comparative systems which only include a single ultrasonic sensor. If there is only a single ultrasonic sensor, due to close range, feedback which interferes with operation can occur. The dedicated transmit and receive sensors 20A, 20B eliminate this feedback problem. The at least one sensor 20 or sensors 20A, 20B of the system 10 may utilize aspects of the sensors described in WO2015/148611, U.S. Pat. No. 8,154,418, WO2011044312; WO2012051500, and/or WO 2013/071070, which are hereby incorporated herein by reference in their entireties.

Figure 9:
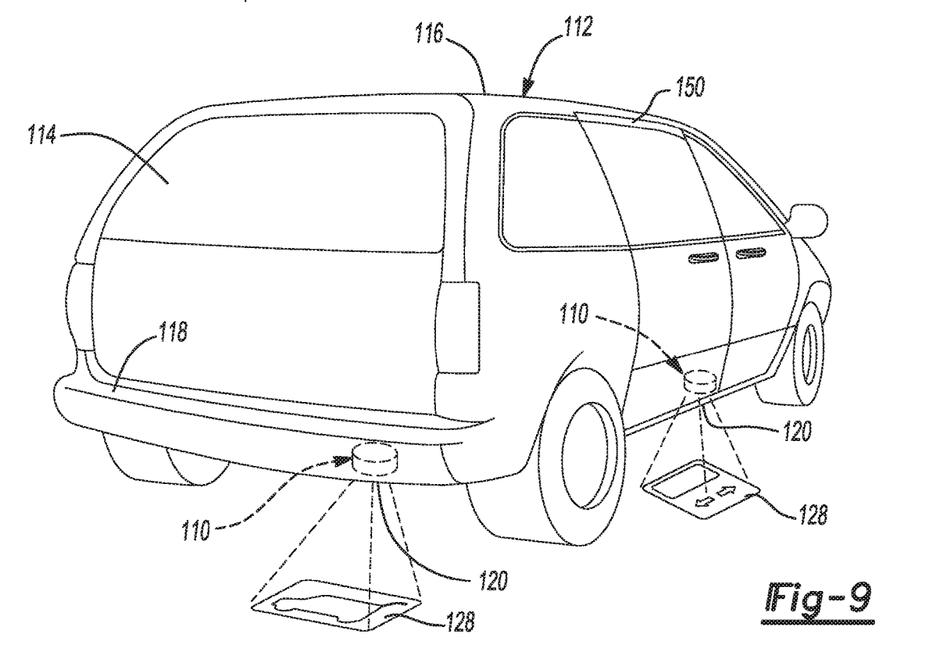
FIG. 9 is a perspective view of an example motor vehicle equipped with a pair of user-activated, non-contact power closure member systems for opening a sliding door and rear liftgate of the vehicle which shows the locations of the sensors and is constructed in accordance with the teachings of the present disclosure.

As best shown in FIG. 9, the indicator 128 used to notify the user 24, for example, can be a projected image or light 128 near the vehicle 112, according to aspects of the disclosure. Much like the system 10 above, a user-activated, non-contact power closure member system 110 is integrated into a rear bumper 118 of the vehicle body 116 includes at least one sensor 120 which senses an object or motion and can initiate the opening of the rear liftgate 114 coupled to the vehicle body 116. In addition, another user-activated, non-contact power closure member system 110 is disposed below a sliding door 150 coupled to the vehicle 112 and includes at least one sensor 120 which senses an object or motion and can initiate the opening of the sliding door 150 relative to the vehicle body 116. While the systems 10, 110 are illustrated as disposed on the rear bumper below the rear liftgate 14, 114 and sliding door 150, the systems 10, 110 can be provided at other locations, for example the system 10 can be disposed on the side of the rear bumper 18, 118 not below the liftgate 14, 114 so that the user is not in path of opening or closing of the liftgate 14, 114 after placing or moving their foot in the zone of detection below the side of the rear bumper 18, 118.

Figure 10:
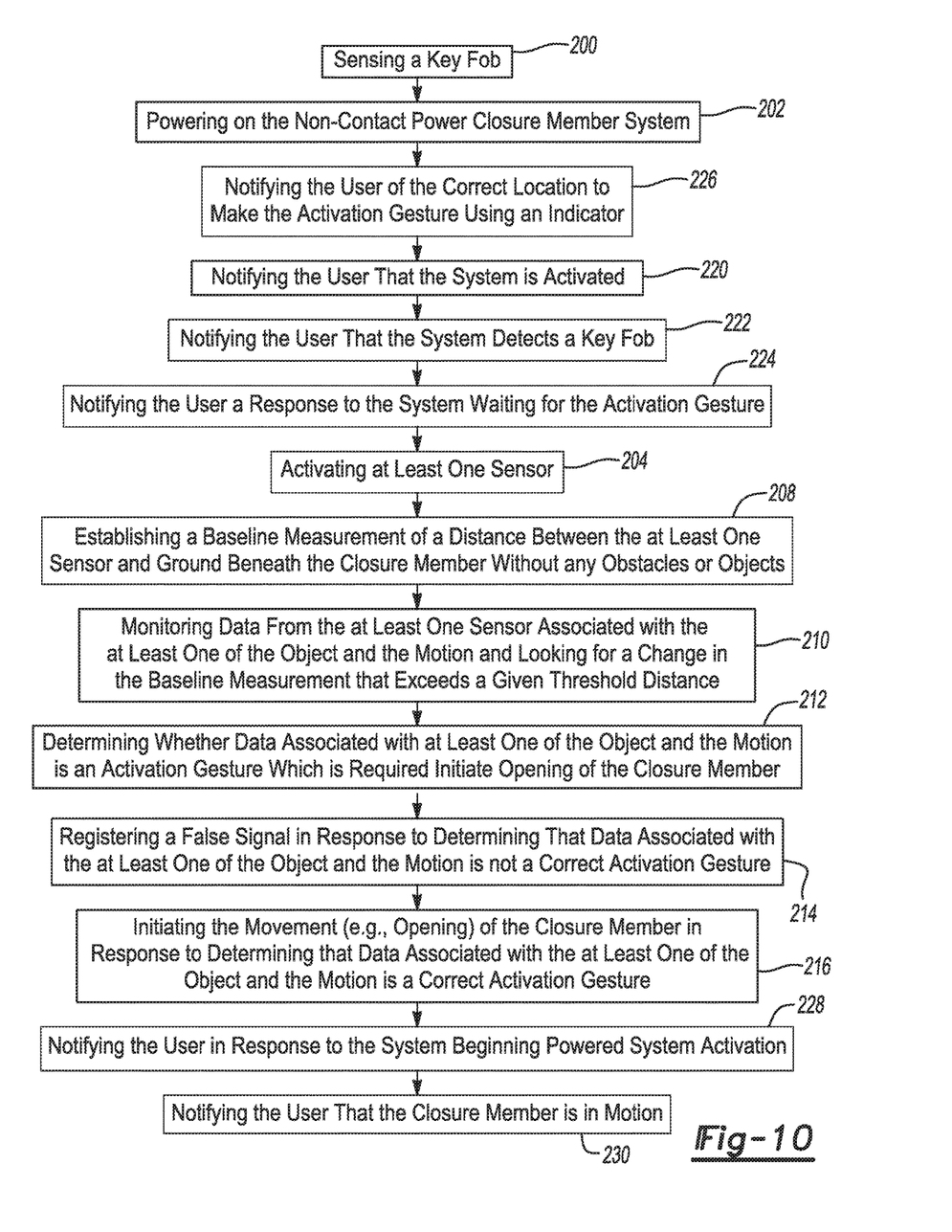
FIGS. 10 and 11 are flow charts illustrating steps of a method of operating a closure member of a vehicle using a non-contact power closure member system in accordance with the teachings of the present disclosure.
Figure 11:
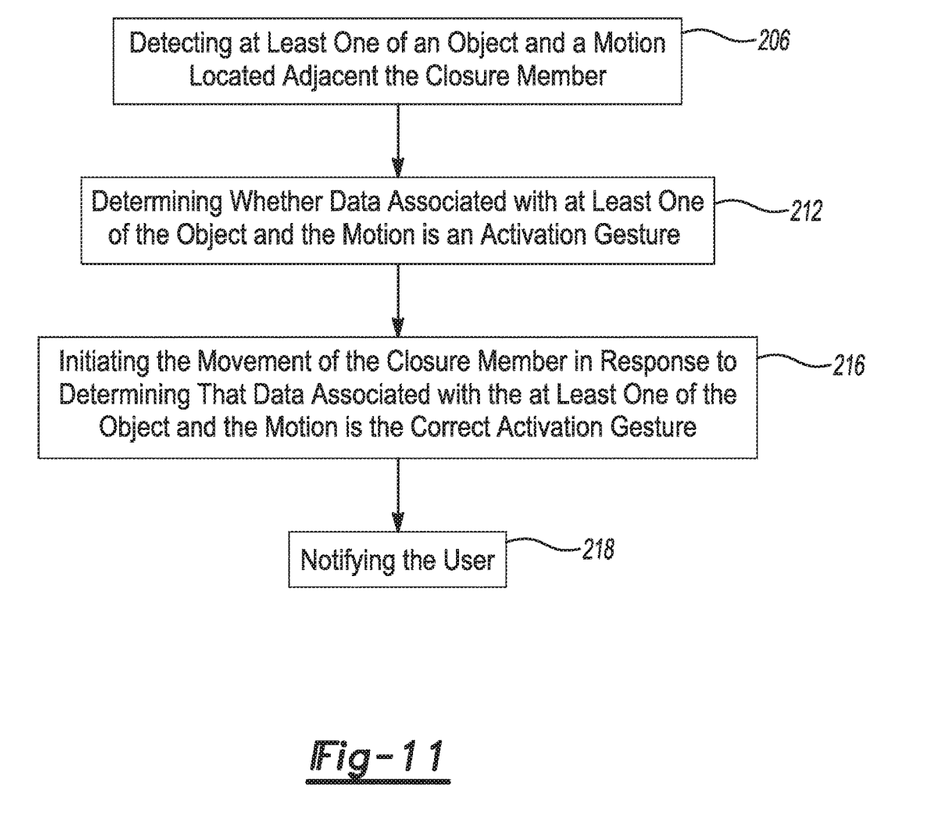

A method of operating a closure member (e.g., rear liftgate 14) of a vehicle 12, 112 is also provided, as shown in FIGS. 10 and 11. According to the example embodiment, as the user 24 approaches the vehicle 12, 112 the vehicle 12, 112 senses the key fob 22 and powers on the non-contact power closure member system 10, 110. So, the method begins with the steps of 200 sensing a key fob and 202 powering on the non-contact power closure member system 10, 110. Once the system 10, 110 wakes up, the ultrasonic sensors 20, 20A, 20B, 120 and indicator 28, 128 are activated. Thus, the method proceeds with the step of 204 activating at least one sensor 20, 120.

The method continues with the step of 206 detecting at least one of an object and a motion located adjacent the closure member (e.g., rear liftgate 14, 114 or sliding door 150) using at least one sensor 20, 120. According to the example embodiment, the electronic control unit 32 first establishes a baseline measurement, which can be a distance between the at least one sensor 20, 120 and ground beneath the rear liftgate 14, 114 without any obstacles. So, the step of 206 detecting at least one of an object and a motion located adjacent the closure member can include 208 establishing a baseline measurement of a distance between the at least one sensor 20, 120 and ground beneath the closure member (e.g., rear liftgate 14, 114) without any obstacles or objects. The electronic control unit 32 of the system 10, 110 then continues to monitor the sensor data and looks for a change in the baseline measurement that exceeds a given threshold distance. Therefore, the method can also include the step of 210 monitoring data from the at least one sensor 20, 120 associated with the at least one of the object and the motion and looking for a change in the baseline measurement that exceeds a given threshold distance. Once the threshold distance has been exceeded, the software of the electronic control unit 32 perceives this as the correct activation gesture, rather than a false signal, and communicates to the power liftgate electronic control unit that an opening or closing request has been given. So, the method can include the step of 212 determining whether data associated with at least one of the object and the motion is an activation gesture (which is required initiate opening of the closure member). If the detected data does not meet the threshold set, then the software of the electronic control unit 32 determines a false signal occurred, for example which could occur by an object unintentionally moving beneath the rear bumper 18, 118. Therefore, the method can include the step of 214 registering a false signal in response to determining that data associated with the at least one of the object and the motion is not a correct activation gesture (i.e., the detected data not does not meet the threshold set). The registration of a false signal could also include notifying the user 24 of the false signal. After the correct activation signal is communicated to the electronic control unit 32, the electronic control unit 32 can then initiate the opening of the rear liftgate 14, 114. So, the method includes the step of 216 initiating the movement (e.g., opening or closing) of the closure member in response to determining that data associated with the at least one of the object and the motion is a correct activation gesture.

The method also includes the step of 218 notifying the user 24. In the example embodiment, the indicator 28 is a lighted picture on the rear bumper 18, 118 to notify the user 24 that the system 10, 110 is activated and waiting for the activation gesture from the user 24 to open the rear liftgate 14, 114. So, the step of 218 notifying the user 24 can include 220 notifying the user 24 in response that the system 10, 110 is activated (e.g., when the key fob 22 is sensed and the non-contact power closure member system 10, 110 is powered on), 222 notifying the user 24 that the system detects a key fob 22, and/or 224 notifying the user 24 in response to the system 10, 110 waiting for the activation gesture. The indicator 28, 128 also notifies the user 24 of the correct position to perform the activation gesture, which in this case is the presence of a foot. Thus, the step of by 218 notifying the user can include 226 notifying the user 24 of the correct location to make the activation gesture using an indicator 28, 128. As discussed above, step of 218 notifying the user 24 can take other forms, such as another type of light or lighted area along or near the rear bumper 18, tail lights, reverse lights, signal lights, an object or projection on a glass of the vehicle 12 (e.g., one of the windows of the vehicle 12). Notifying the user 24 can also include the use of an audible warning tone, honk, or beep, with or without the use of a lighted or projected graphic.

The user 24 then places his or her foot under or near the lighted indicator 28, 128. Once the foot is detected, the indicator 28, 128 flashes and optionally an audible tone can be made by the system 10, 110 or another component of the vehicle 12, 112 to indicate the presence of the foot. The user 24 then leaves his or her foot stationary and/or makes a motion for a required period of time needed to initiate opening of the rear liftgate 14, 114. Therefore, the step of by 218 notifying the user 24 can include 228 notifying the user 24 in response to the system beginning powered system activation (e.g., just before the power liftgate electronic control unit starts moving the rear liftgate 14, 114).

According to the example embodiment, the system 10, 110 again flashes the indicator 28, 128 and makes the audible tone to indicate opening of the rear liftgate 14, 114, and the rear liftgate 14, 114 opens. So, the step of 218 notifying the user 24 can include 230 notifying the user 24 that the closure member is in motion (e.g., when the power liftgate electronic control unit is moving the rear liftgate 14, 114).

Clearly, changes may be made to what is described and illustrated herein without departing from the scope defined in the accompanying claims. The system 10, 110 may be operable for any kind of different closure member or device incorporated within the motor vehicle 12, 112, for example and advantageously improves upon capacitive sensing solutions.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure. Those skilled in the art will recognize that concepts disclosed in association with the example user-activated, non-contact power closure member system can likewise be implemented into many other systems to control one or more operations and/or functions.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "top", "bottom", and the like, may be used herein for ease of description to describe one element's or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated degrees or at other orientations) and the spatially relative descriptions used herein interpreted accordingly.

What is claimed is:

1. A user-activated, non-contact power closure member system for operating a closure member of a vehicle, comprising:
    at least one sensor for sensing at least one of an object and motion adjacent the closure member and outputting data corresponding to at least one of an object and motion;
    at least one indicator disposed on the vehicle in a location indicating an appropriate location to make a correct activation gesture;
    an electronic control unit coupled to said at least one sensor and said at least one indicator and configured to:
        receive and process data corresponding to the at least one of the object and motion from said at least one sensor,
        determine whether the data associated with the at least one of the object and motion is the correct activation gesture required to move the closure member,
        initiate movement of the closure member in response to the at least one of the object and motion being the correct activation gesture, and
        notify the user using said at least one indicator of the appropriate location to make the correct activation gesture and inform the user that that they are making the activation gesture in the correct location.

2. The system as set forth in claim 1, wherein said electronic control unit is further configured to receive data corresponding to the at least one of the object and motion in response to detection of a fob associated with the vehicle being located within a predetermined distance of the vehicle.

3. The system as set forth in claim 1, wherein said indicator is disposed directly adjacent said at least one sensor.

4. The system as set forth in claim 1, wherein the closure member is a rear liftgate and said indicator is disposed on a rear bumper of the vehicle below the rear liftgate.

5. The system as set forth in claim 1, wherein the closure member is a sliding door and said indicator is disposed on the vehicle below sliding door.

6. The system as set forth in claim 1, wherein said indicator is at least one of a projected image and a light.

7. The system as set forth in claim 6, wherein said indicator has a different color in an on state and in an off state.

8. The system as set forth in claim 1, wherein said at least one sensor includes a pair of sensors and one of said pair of sensors is a transmit sensor and the other is a receive sensor.

9. The system as set forth in claim 1, wherein said control unit is further configured to notify the user that said system is activated.

10. The system as set forth in claim 1, wherein said control unit is further configured to notify the user that said system detects a key fob.

11. The system as set forth in claim 1, wherein said electronic control unit includes at least one light emitting diode and is disposed within a housing.

12. The system as set forth in claim 11, further including an image cover disposed over said housing including a cutout of a graphic lit by said at least one light emitting diode.

13. A method of operating a closure member of a vehicle using a non-contact power closure member system comprising the steps of:
    notifying a user of an appropriate location to make a correct activation gesture using at least one indicator disposed on the vehicle in a location indicating the appropriate location;
    detecting at least one of an object and a motion located adjacent the closure member using at least one sensor;
    determining whether data associated with at least one of the object and the motion is the correct activation gesture which is required to initiate opening of the closure member; and
    initiating movement of the closure member in response to determining that the data associated with the at least one of the object and the motion is the correct activation gesture.

14. The method as set forth in claim 13, further including the step of registering a false signal in response to determining that the data associated with the at least one of the object and the motion is not the correct activation gesture.

15. The method as set forth in claim 13, further including the step of notifying the user in response to the system beginning powered system activation.

16. The method as set forth in claim 13, further including the step of notifying the user that the system is activated.

17. The method as set forth in claim 13, further including the step of notifying the user that the system detects a key fob.

18. The method as set forth in claim 13, further including the step of notifying the user that the closure member is in motion.

19. The method as set forth in claim 13, further including the step of notifying the user in response to the system waiting for the activation gesture.

20. The method as set forth in claim 13, wherein the step of detecting at least one of the object and the motion located adjacent the closure member using at least one sensor includes detecting at least one of the object and the motion located adjacent the closure member using at least one sensor in response to a key fob associated with the vehicle being within a predetermined distance of the vehicle.

* * * * *